United States Patent [19]

Lunt

[11] 4,345,511

[45] Aug. 24, 1982

[54] SULFUR DIOXIDE ADDITION FOR MUST

[75] Inventor: James W. Lunt, Fresno, Calif.

[73] Assignee: Paul Masson, Inc., Saratoga, Calif.

[21] Appl. No.: 252,908

[22] Filed: Apr. 10, 1981

Related U.S. Application Data

[62] Division of Ser. No. 184,145, Sep. 4, 1980, Pat. No. 4,302,476.

[51] Int. Cl.³ .............................................. C12C 7/14
[52] U.S. Cl. ...................................... 99/276; 426/231
[58] Field of Search .............. 99/276, 277, 278, 323.1, 99/323.2; 426/231, 15, 330.4, 330.5, 474, 320, 319

[56] References Cited

U.S. PATENT DOCUMENTS

| | | | |
|---|---|---|---|
| 3,071,469 | 1/1963 | Krabbe | 99/277.1 |
| 3,505,946 | 4/1970 | Bayne | 99/278 |
| 3,900,571 | 8/1975 | Johnson | 99/276 |
| 4,173,178 | 11/1979 | Wieland | 99/323.1 |

Primary Examiner—Robert W. Jenkins

Attorney, Agent, or Firm—Kane, Dalsimer, Kane, Sullivan and Kurucz

[57] ABSTRACT

A system and process for relatively quickly applying and evenly distributing accurate amounts of sulfur dioxide to must. The system comprises a sulfur dioxide containment vessel and means for pressurizing the sulfur dioxide in the vessel with an inert gas. Conduit means delivers the sulfur dioxide to a must flow conduit. An inert gas under relatively low pressure is introduced into the conduit for the sulfur dioxide conduit means for ultimate delivery to the must flow conduit. Metering means delivers the precise proportions of sulfur dioxide to the must flow conduit.

The process enables the introduction of precise proportions of the sulfur dioxide to the must flow conduit and the introduction of an inert gas under relatively low pressure along with the sulfur dioxide into the must. In addition to the accurate delivery of sulfur dioxide to the must, the back flow of juice from the must is prevented when the supply of sulfur dioxide is stopped as a result of the continuous flow of the relatively low pressure inert gas into the must flow conduit.

8 Claims, 1 Drawing Figure

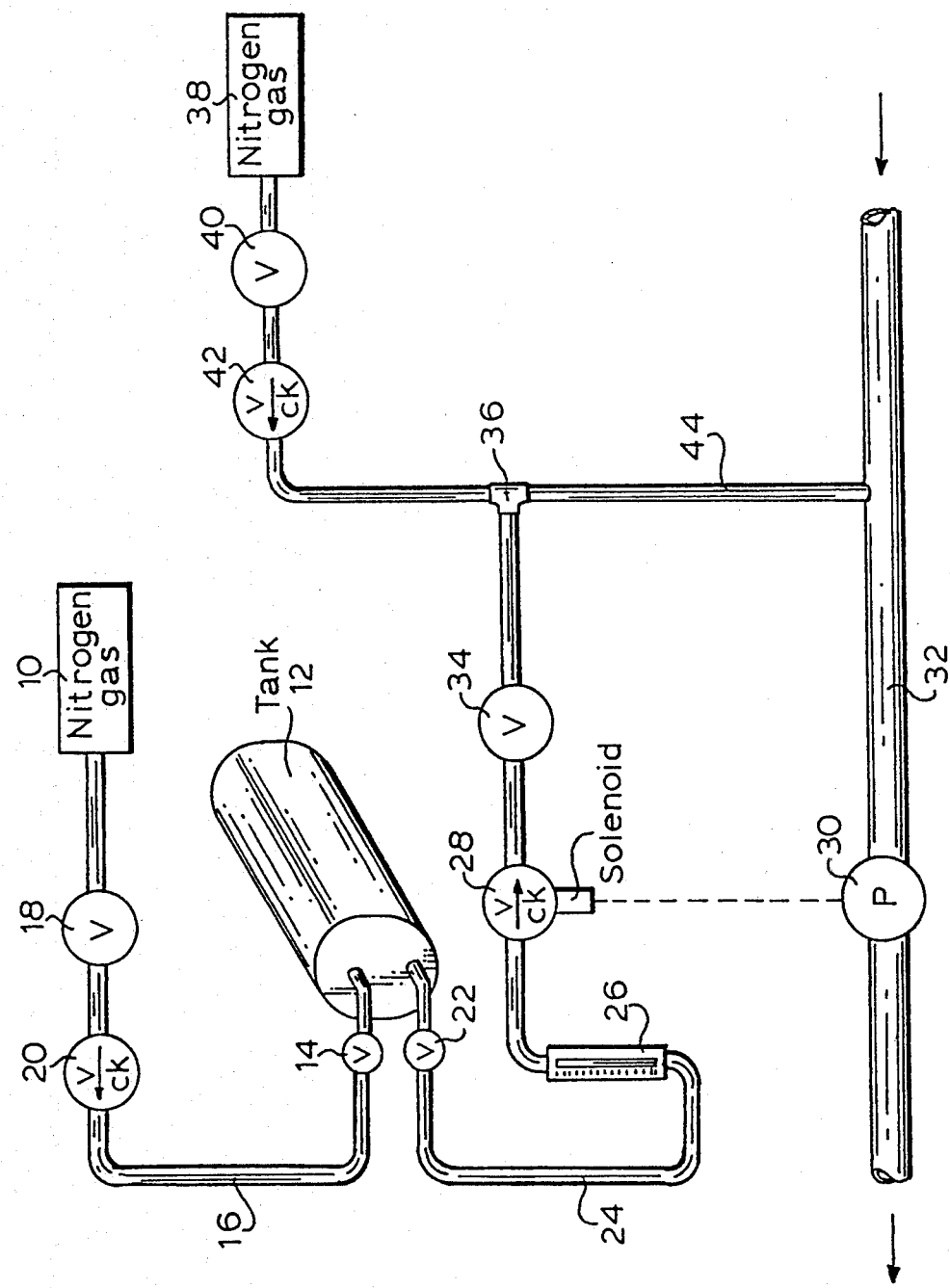

SULFUR DIOXIDE ADDITION FOR MUST

This is a division, of application Ser. No. 184,145, filed Sept. 4, 1980, now U.S. Pat. No. 4,302,476.

BACKGROUND OF THE INVENTION

It is recognized in wine making procedures that the introduction of sulfur dioxide into must at an early stage will reduce oxidation and inhibit the growth of natural wild yeast residing in the must. Oxidation of must will result in discoloration of the must juice while the presence of wild yeast may contribute in an undesirable fashion to the organoleptic properties of the wine.

Heretofore, rather rough empirical and sometime arbirtary procedures were deployed in introducing sulfur dioxide. Even manual applications of sulfur dioxide have been employed, and only upon trial and error could the wine maker determine whether or not enough or too much sulfur dioxide was used.

Thus, there has been an ever increasing need for an automatic reproductible system and technique for introducing relatively quickly, accurately and uniformly measured amounts of sulfur dioxide into must.

SUMMARY OF THE INVENTION

A principal object of the present invention is to provide both a system and process for relatively quickly applying and evenly distributing substantially accurate amounts of sulfur dioxide continuously to must while elminating sulfur dioxide corrosion problems and must juice back flow or migration into the system lines.

Another object is to provide a system and process of the foregoing type with a source of supply of sulfur dioxide that is maintained under substantially constant and uniform pressure independent of fluctuations in ambient temperature.

These and other objects and advantages are most effectively attained by a system and process for relatively quickly applying and evenly distributing accurate amounts of sulfur dioxide to must. The system comprises a sulfur dioxide containment vessel and means for pressurizing the sulfur dioxide in the vessel with an inert gas. Conduit means delivers the sulfur dioxide to a must flow conduit. An inert gas under relatively low pressure is introduced into the conduit for the sulfur dioxide conduit means for ultimate delivery to the must flow conduit. Metering means delivers the precise proportions of sulfur dioxide to the must flow conduit.

The process enables the introduction of precise proportions of the sulfur dioxide to the must flow conduit and the introduction of an inert gas under relatively low pressure along with the sulfur dioxide into the must. In addition to the accurate delivery of sulfur dioxide to the must, the back flow of juice from the must is prevented when the supply of sulfur dioxide is stopped as a result of the continuous flow of the relatively low pressure inert gas into the must flow conduit.

BRIEF DESCRIPTION OF THE FIGURE

The FIGURE illustrates the system and technique for sulfur dioxide addition or must according to the invention.

DETAILED DESCRIPTION OF THE PREFERRED EMBODIMENT

Proper addition of sulfur dioxide to must is an important facet of making quality wine. It has been recognized that accurate measurement, quick application and even distribution of sulfur dioxide in must are requirements of a satisfactory system. The FIGURE illustrates a system that satisfies these requirements. In the following, this system is discussed in the order of flow, from the source of sulfur dioxide to its addition to must.

Nitrogen gas from source 10 counter pressurizes a standard one ton sulfur dioxide cylinder 12 through the upper (vapor) valve 14. Counter pressure above the sulfur dioxide vapor pressure, at the highest anticipated ambient temperature, will now allow the cylinder feed pressure to rise and fall with ambient temperature changes. The conduit 16 supplying the gas source 10 and cylinder 12 may include a stainless steel needle valve 18 and a ball check valve 20. Sulfur dioxide liquid is then fed from the lower (liquid) valve 22 of the cylinder 12 at a constant pressure through the conduit 24. This keeps the flow rate, which is pressure related, from varying. At various ambient temperatures and sun loads the vapor pressure will vary causing the flow rate to drift. By having elevated supply pressure lines, pressure drop will not drop the pressure below the vapor pressure of the liquid $SO_2$. This will prevent "gassing" in the supply line feeding the flow meter. In a successful embodiment of this invention, conduit 24 was $\frac{1}{4}''$ copper tubing.

The flow rate of sulfur dioxide is monitored by a tapered glass tube flow meter 26. The calibrations on the meter tube can be converted mathematically or empirically to parts per million of sulfur dioxide relative to must flow, or pounds sulfur dioxide per unit of time. In accordance with a successful embodiment of this invention, the meter 26 was Model 10A3365A manufactured by Fisher & Porter Co., Warmister, Pa.

The valve 28 is a direct acting plunger style solenoid valve. The neoprene valve member, commonly used in this type valve, is replaced with a teflon member machined from teflon rod stock. Teflon is sulfur dioxide resistant compared to neoprene which swells and distorts. The solenoid is wired to open and close with the electrical starting control of the must pump 30 or other equipment (crusher, auger, etc.) which most suitably monitors constant must flow in must flow conduit 32, normally 6" pipe. The solenoid valve in the successful embodiment was a ASCO #826B202 solenoid valve manufactured by Automatic Switch Co., Florham Park, N.J. and having a 5/32" orifice and a substituted teflon member. The electrical coil of the solenoid should be connected to the must pump controller assuming the must pump starts and stops as the crusher hopper fills and empties. If the must pump runs continually, excess $SO_2$ will be fed while the pump idles between loads and connection should be made to some other equipment (auger, etc.) that runs only when grapes are being crushed.

The sulfur dioxide flow rate is controlled by a stainless steel needle valve 34 immediately down stream from the solenoid valve 28. The sulfur dioxide vaporizes as it passes through the needle valve 34, from a high to a low pressure environment. The location of the solenoid valve and needle valve should not be transposed or liquid will be vaporizing under the seat of the solenoid valve causing excessive wear, and the liquid vaporizing in the needle valve will freeze the solenoid valve due to the refrigeration effect. The solenoid and needle valve should be short coupled together. Excess piping between valves will allow liquid between the valves to feed $SO_2$ for a time after the solenoid closes.

The sulfur dioxide vapor flows through a tee 36, where it is joined by a flow of low pressure nitrogen gas from source 38, on its way to the must. The nitrogen, adjusted to a low flow rate by a needle valve 40, flows through ball check valve 42 and then into tee 36 with the sulfur dioxide vapor in conduit 44 and eventually bubbles out of the must. In the successful embodiment, conduit 44 was ⅜″ tubing and valve 40 was model #D105NX with needle valve manufactured by Foxboro Co. Foxbow, Mass. When the solenoid valve 28 closes, shutting off the flow of sulfur dioxide, the nitrogen continues to flow, slowly pushing the sulfur dioxide vapor out to the must, preventing juice from migrating back up the vapor line. Without this nitrogen flow migration becomes a severe problem due to the high solubility of sulfur dioxide. The resultant moisture in the vapor line and valve parts produce sulfurous acid which cause system corrosion. Both nitrogen lines are protected from sulfur dioxide back flow by providing corrosion resistant check valves 20 and 42. This protection is necessary in the event there is a nitrogen pressure loss or higher than anticipated ambient temperatures.

The sulfur dioxide vapor conduit 20 diameter must be large enough to allow vapor flow without back pressure, and the length must be sufficient to allow warming of the sulfur dioxide chilled from vaporization at the needle valve 34. Otherwise, flooding of the vapor conduit 44 with liquid sulfur dioxide and ice formation where the vapor conduit enters the must will result.

The sulfur dioxide vapor enters the must at the suction side of the must pump 30, the crusher/stemmer basin, or other suitable location. By entering the must on the low pressure side of the must pump 30, sulfur dioxide vaporization at the needle valve 34 is assured. The action of the pump 30 also assures complete and prompt mixing of sulfur dioxide and must. No noticable corrosion from sulfur dioxide has been observed on stainless steel, cast iron or aluminum pump parts used with the system of this invention.

This system has proven it can add sulfur dioxide accurately, quickly and evenly with a minimum of operator attention. Thus, the several aforenoted objects and advantages are most effectively attained. Although a single somewhat preferred embodiment of the invention has been disclosed and described in detail herein, it should be understood that this invention is in no sense limited thereby and its scope is to be determined by that of the appended claims.

What is claimed is:

1. A system for relatively quickly applying and evenly distributing substantially accurate amount of sulfur dioxide continuously to must being pumped through a conduit during a wine making procedure, comprising: a first conduit containing must that is being pumped therethrough, a cylinder containing sulfur dioxide, means for maintaining the sulfur dioxide in the cylinder under constant and uniform pressure, a conduit means extending from the cylinder to the must line for delivering sulfur dioxide thereto, a flow meter in the conduit means for accurately monitoring the amount of sulfur dioxide deliver to the must conduit, a valve for closing the conduit means when no must is flowing in the must conduit and opening the conduit means when must is flowing in the must conduit, control means for controlling the rate of flow of sulfur dioxide delivered to the must conduit, a first source of supply of an inert gas under pressure, and a second conduit for delivering the inert gas to the sulfur dioxide conduit means for entry with the sulfur dioxide into the must conduit so that upon closing of the sulfur dioxide conduit means by the valve, the inert gass will be adapted to prevent juice from the must from migrating back into the conduit means.

2. The invention in accordance with claim 1 wherein the sulfur dioxide is in liquid form in the cylinder, a second source of inert gas under pressure communicates with the upper surface of the sulfur dioxide in the cylinder to minimize fluctuations in the rate of flow of the sulfur dioxide from the cylinder with changes in ambient temperature.

3. The invention in accordance with claim 2 wherein a third conduit extends from the second source of the inert gas and the cylinder, a valve in the third conduit for opening and closing the third conduit and a control means for controlling the rate of flow of inert gas in the third conduit.

4. The invention in accordance with claim 1 wherein the valve in the conduit means is a solenoid actuated valve.

5. The invention in accordance with claim 4 wherein a pump is connected with the must conduit for pumping the must therethrough, and the solenoid is electrically coupled with the pump to maintain the conduit means open when the pump is running and to close the conduit means when the pump is not running.

6. The invention in accordance with claim 1 wherein the control means in the conduit means includes a valve.

7. The invention in accordance with claim 1 wherein the second conduit includes a valve for opening and closing the second conduit and a control means for controlling the rate of flow of inert gas in the second conduit.

8. The invention in accordance with claim 1 wherein the first source of supply of inert gas is under relatively low pressure and is introduced into the sulfur dioxide conduit means at a location between the must conduit and control means in the conduit means.

* * * * *